Sept. 1, 1970  J. B. MEADEN ET AL  3,526,281
MOUNTING APPARATUS FOR CULTIVATOR SHIELDS
Filed Nov. 22, 1967  2 Sheets-Sheet 1

INVENTORS.
JAMES B. MEADEN
RONALD S. CONWAY
BY Merchant & Gould
ATTORNEYS

Sept. 1, 1970     J. B. MEADEN ET AL     3,526,281
MOUNTING APPARATUS FOR CULTIVATOR SHIELDS
Filed Nov. 22, 1967     2 Sheets-Sheet 2
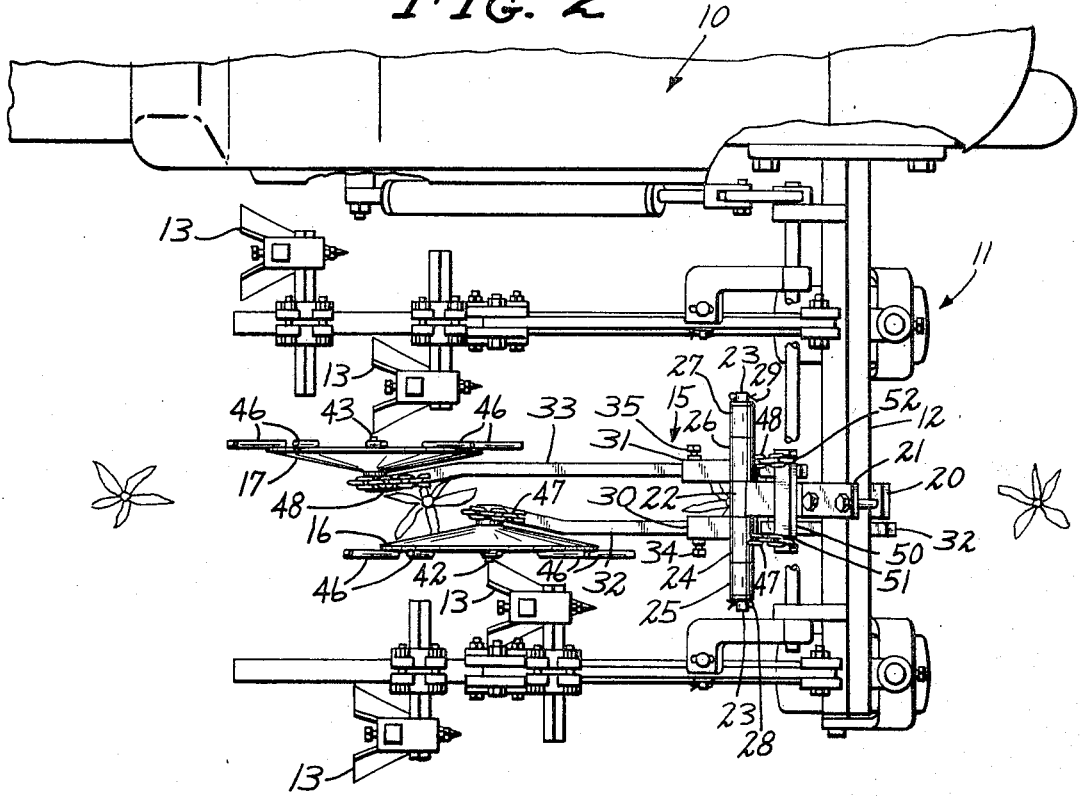
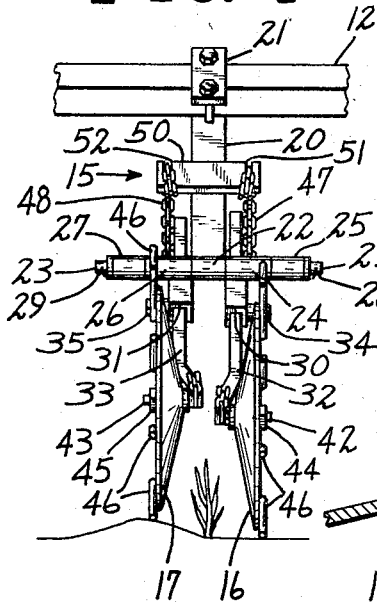
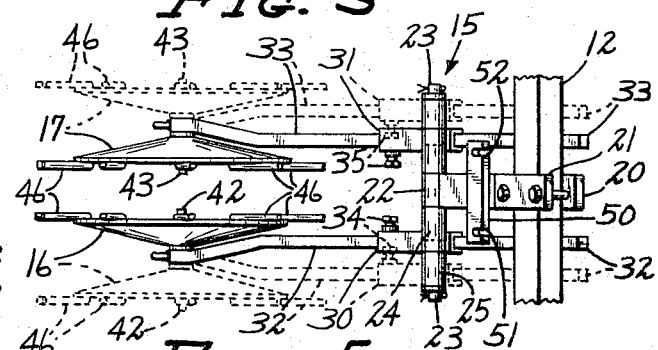
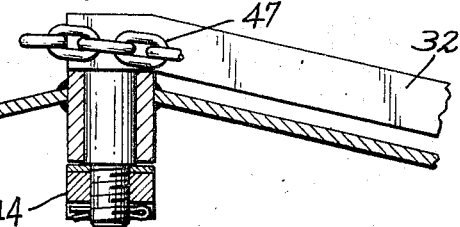
INVENTORS.
JAMES B. MEADEN
BY RONALD S. CONWAY
Merchant & Gould
ATTORNEYS

United States Patent Office 3,526,281
Patented Sept. 1, 1970

3,526,281
MOUNTING APPARATUS FOR CULTIVATOR SHIELDS
James B. Meaden, 3009 Norwood Ave., and Ronald S. Conway, 2759 Linden Ave., both of Slayton, Minn. 56172
Filed Nov. 22, 1967, Ser. No. 685,205
Int. Cl. A01b 17/00
U.S. Cl. 172—510     3 Claims

ABSTRACT OF THE DISCLOSURE

A spindle attached to the frame of a cultivator so the longitudinal axis thereof is perpendicular to the direction of movement with two parts individually rotatably mounted on the spindle so that two shafts slidably engaged therein extend in a direction generally parallel to the movement of the cultivator. Each of the shafts has a rotary cultivator shield affixed thereto. The two parts are adjustable along the length of the spindle, the position of the spindle relative to the cultivator is adjustable in a direction transverse to the movement of the cultivator, and the two shafts are individually adjustable so they can be placed on either side of a crop row at the position most in need of shielding.

BACKGROUND OF THE INVENTION

Field of the invention

In the cultivation of row crops it is common practice to set the cultivator shovels relatively near the plants, especially when they are small, to produce the highest degree of benefit from the soil tillage. As the plants progress the manner of cultivation is altered and loose soil is moved towards the plants to form a ridge on the side of the row of plants, which is commonly called "hilling up." The amount of soil moved towards the plants varies according to the size of the plants. In all of the various stages of cultivation, cultivator shields generally of the rotary type are utilized to control the amount of dirt and lumps moved toward the plants and to protect the plants from being covered up, etc.

Brief description of the prior art

In the prior art cultivator shields are generally fixedly attached to the cultivator in pairs so as to be positioned directly opposite each other on both sides of a row. In some instances the cultivator shields are affixed to the cultivator for limited vertical movement, in the event that the shields strike an obstruction or the like. Each of these prior art devices is constructed with cultivator shields mounted in pairs and, if adjustable, the shields must be adjusted in pairs. This seriously handicaps the operator and greatly diminishes the versatility of the cultivator.

SUMMARY OF THE INVENTION

The present invention pertains to apparatus for mounting cultivator shields wherein spindle means are attached to a row crop cultivator with the longitudinal axis generally transverse to the direction of said cultivator and first and second elongated shafts are rotatably mounted on the spindle so as to extend parallel to a row and on either side thereof, each shaft being adapted to have a cultivator shield affixed thereto and each shaft further being adjustable, individually, along the longitudinal axis thereof relative to the cultivator and along the longitudinal axis of the spindle relative to the cultivator.

It is an object of the present invention to provide a new and improved apparatus for mounting cultivator shields on row crop cultivators.

It is a further object of the present invention to provide apparatus for mounting cultivator shields wherein the shields are mounted in pairs but each shield is individually adjustable in the direction of movement of the cultivator and transverse to the direction of movement of the cultivator.

These and other objects of this invention will become apparent to those skilled in the art upon consideration of the accompanying specification, claims, and drawings.

BRIEF DESCRIPTION OF THE DRAWINGS

Referring to the drawings, wherein like characters indicate like parts throughout the figures:

FIG. 2 is a view in top plan of the cultivator and apparatus attached thereto as illustrated in FIG. 1;

FIG. 3 is a view in top plan of the apparatus, illustrating in dotted lines a variation in the shield placement;

FIG. 4 is a view of the apparatus in rear elevation illustrating the individual vertical movement of the cultivator shields;

FIG. 5 is an enlarged sectional view as seen from the line 5—5 in FIG. 1; and

DESCRIPTION OF THE PREFERRED EMBODIMENT

Figure 1:
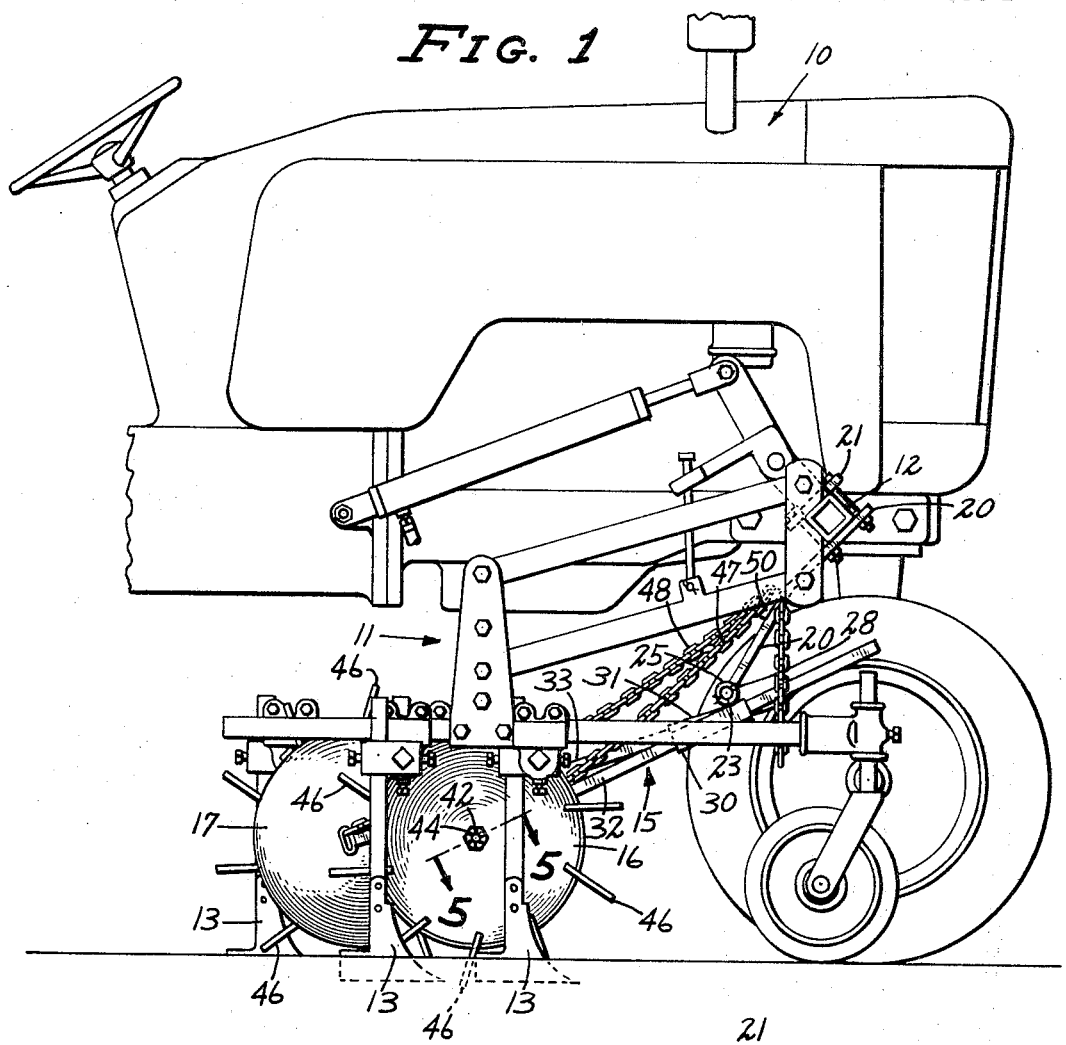
FIG. 1 is a view in side elevation of a cultivator attached to a tractor and having the present apparatus operatively attached thereto.
Figure 6:
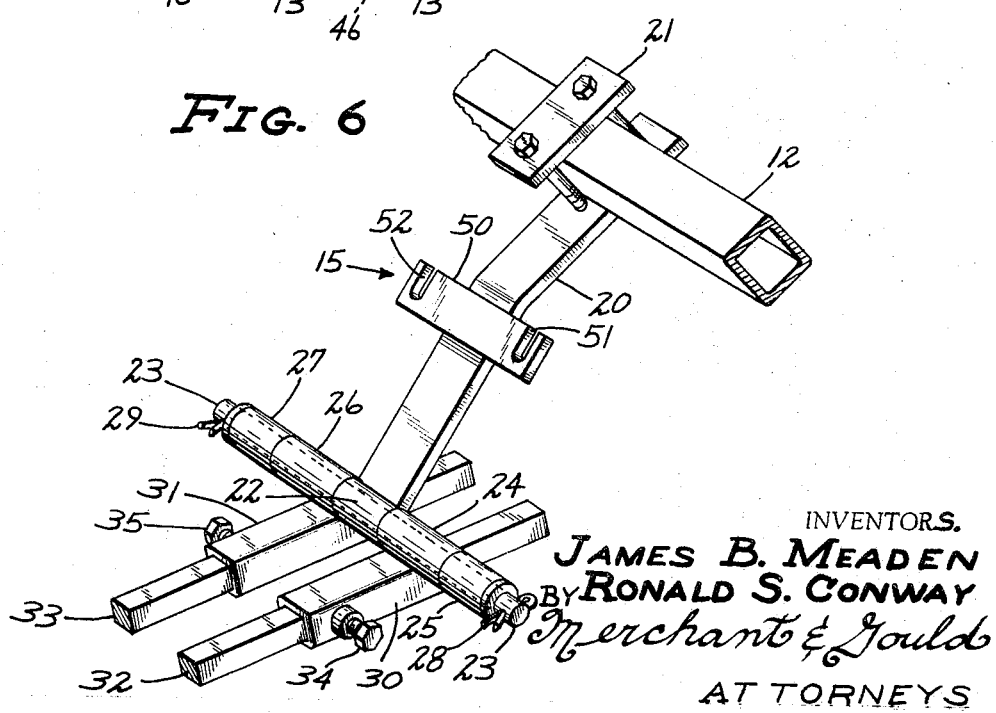
FIG. 6 is an enlarged view in perspective of the present mounting apparatus, parts thereof removed and shown in section.

In the figures the numeral 10 designates a tractor having a cultivator generally designated 11 mounted thereon. The cultivator 11 has a mounting frame 12 extending transversely outwardly from either side of the tractor 10. The mounting frame 12 has a plurality of cultivator shovels 13 attached thereto in the usual manner for engagement with the soil. Mounting apparatus generally designated 15 is attached to the mounting frame 12 and carries a pair of rotary shields 16 and 17 thereon. The cultivator 11 is not explained in detail since any of the various cultivators presently available commercially are suitable to receive the mounting apparatus 15 thereon.

The mounting apparatus 15 includes a flat bar 20 having one end removably attached to the underside of the mounting frame 12 by a U-shaped clamp 21 formed from a plate lying on the upper surface of the mounting frame 12 and a bolt extending through the plate, along either side of the mounting frame 12 and through the bar 20. The clamp 21 retains the bar 20 substantially immovable relative to the mounting frame 12 but allows adjustment thereof longitudinally along the mounting frame 12 or in a direction transverse to the movement of the tractor 10. The bar 20 extends downwardly and rearwardly from the mounting frame 12 and the other end thereof terminates in a tubular member or bearing 22. The bearing 22 has a spindle 23 rotatably mounted therein with its longitudinal axis extending approximately horizontal and transverse to the direction of movement of the tractor 10. The spindle 23 has two additional bearings 24–25 and 26–27 on either side thereof. The bearings 24 through 27 are maintained on spindle 23 by cotter pins 28 and 29, respectively, extending through holes in the spindle 23 to the longitudinal axis thereof.

Each of the bearings 24 and 26 has a tubular member 30 and 31, respectively, fixedly attached thereto by welding or the like. The opening through the tubular members 30 and 31 has a substantially square cross section and a pair of elongated square shafts 32 and 33 are slidably engaged in the tubular members 30 and 31, respectively. The tubular member 30 and 31 are attached to the bearings 24 and 26 so as to extend approximately parallel with the direction of movement of the tractor 10 and the shafts 32 and 33 are similarly disposed. The shafts 32 and 33 are held fixedly in any desired longitudinal position within the tubular members 30 and 31 by adjustment bolts 34 and 35 threadedly engaged through a sidewall of each of the tubular members 30 and 31. The bearings 24 through 27 are interchangable on the spindle 23 to provide transverse adjustment of the spacing between the shafts 32 and 33. It should be understood that the length of the spindle 23 and the size and number of bearings positioned thereon can be modified to provide any number and size of adjustment steps in the spacing between the shafts 32 and 33. Also, many modifications of the spindle 23 and means of attaching it to the shafts 32 and 33 and the mounting frame 12 may be provided by those skilled in the art.

The rotary cultivator shields 16 and 17 are rotatably attached to the shafts 32 and 33, respectively, adjacent the rearmost end thereof by means of threaded spindles 42 and 43. One end of the spindle 42 is fixedly engaged on the shaft 32 so that the spindle 42 extends outwardly therefrom approximately perpendicular to the longitudinal axis of the shaft 32. The cultivator shield 16 is rotatably mounted on the spindle 42 and held in place by a nut 44 threadedly engaged on the spindle 42. In a similar fashion the spindle 43 is attached to the shaft 33 with the shield 17 rotatably engaged thereover and a nut 45 threadedly engaged on the spindle 43. The shafts 32 and 33 are bent slightly to offset the rear end thereof from the front portion so that the rotary shields 16 and 17 are positioned directly behind the tubular members 30 and 31. Each of the cultivator shields 16 and 17 is formed in a dish-like configuration with a plurality of rods 46 extending outwardly from the periphery thereof in a direction generally transverse to the rotary axis of the shields 16 and 17. The rods 46 aid in directing trash, such as corn stalks and the like, away from the plants being cultivated.

One end of a chain 47 is fixedly attached to the rearmost end of the shaft 32, adjacent the rotary axis of the shield 16, by some means such as bolting, welding, or the like. In a similar fashion one end of a second chain 48 is attached to the rearmost end of the shaft 33. A bar 50 is fixedly attached to the mid-portion of the bar 20 so as to extend outwardly in either direction, generally transverse to the longitudinal axis of the bar 20. The bar 50 has two slots 51 and 52 therein positioned on either side of the bar 20 and adapted to receive links of the chains 47 and 48, respectively. Referring to FIG. 1, when links of the chains 47 and 48 are properly engaged in the slots 51 and 52 of the bar 50 the counterclockwise rotation, or downward movement, of the shields 16 and 17 and their associated shafts 32 and 33 is limited. Thus, the shields 16 and 17 and their associated shafts 32 and 33 are free to move upwardly when obstructions or the like are engaged but the downward movement thereof is limited.

Mounting apparatus 15 attaches the rotary cultivator shields 16 and 17 to the cultivator 11 for individual movement and adjustments thereof. The shields 16 and 17 can be staggered, as illustrated in FIGS. 1 and 2 or substantially any desired amount, to reduce the amount of hilling and to allow the most beneficial placement of the cultivator shovels 13. Further, the transverse spacing between the rotary cultivator shields 16 and 17 can be adjusted for different sized plants. Also, each of the shields 16 and 17 is free to rotate about the spindle 23, individually, so that an obstruction to one of the shields 16 or 17 does not hamper the function of the other shield.

What is claimed is:

1. Apparatus for mounting cultivator shields on row crop cultivators comprising:
   (a) spindle means;
   (b) means for mounting said spindle means on a cultivator with the longitudinal axis thereof generally transverse to the direction of movement of said cultivator;
   (c) first and second elongated shafts;
   (d) means attaching each of said first and second shafts to said spindle means including first and second parts each having a first tubular member, approximately coaxially engaged with said spindle means for rotation thereabout, and a second tubular member fixedly attached to said first tubular member with the axes thereof approximately perpendicular and said second tubular members each having one of said shafts approximately coaxially engaged therein for adjustable relative longitudinal movement therebetween;
   (e) a plurality of tubular members interchangably positioned on said spindle in association with the first tubular members of said first and second parts for providing a desired transverse spacing between said first and second shafts; and
   (f) means for attaching cultivator shields to each of said shafts.

2. Apparatus for mounting cultivator shields on row crop cultivators as set forth in claim 1 wherein the means for mounting said spindle means on a cultivator includes an elongated bar having a clamp adjacent one end for attachment to the cultivator frame and a bearing adapted to receive the spindle means therein fixedly attached adjacent the other end.

3. Apparatus for mounting cultivator shields on row crop cultivators as set forth in claim 1 having in addition means for limiting the rotation of each of said shafts in at least one direction about the axis parallel with the longitudinal axis of said spindle.

References Cited

UNITED STATES PATENTS

| Re. 9,085 | 2/1880 | Allison | 172—510 XR |
|---|---|---|---|
| 36,922 | 11/1862 | Taliaferro | 172—510 XR |
| 154,081 | 8/1874 | Pollard | 172—510 XR |
| 580,250 | 4/1897 | Calton | 172—510 XR |
| 806,446 | 5/1905 | Young | 172—513 |
| 848,741 | 4/1907 | Hardman | 172—513 |
| 979,264 | 12/1910 | Darden | 172—510 |
| 1,003,029 | 9/1911 | Brigden | 172—510 |
| 1,154,063 | 9/1915 | Schmitt | 172—513 |
| 1,377,115 | 5/1921 | Clayton | 172—510 |
| 1,789,780 | 1/1931 | Schultz | 172—513 |
| 2,433,199 | 12/1947 | Carter | 172—510 |
| 3,247,911 | 4/1966 | Erickson | 172—510 |
| 3,429,379 | 2/1969 | Tebben | 172—510 |

EDGAR S. BURR, Primary Examiner

U.S. Cl. X.R.

172—513